W. T. SMITH.
TIRE.
APPLICATION FILED JUNE 24, 1907.

1,065,978.

Patented July 1, 1913.
4 SHEETS—SHEET 1.

WITNESSES.
E. Howard
Joseph Bates.

INVENTOR.
Wm T. Smith

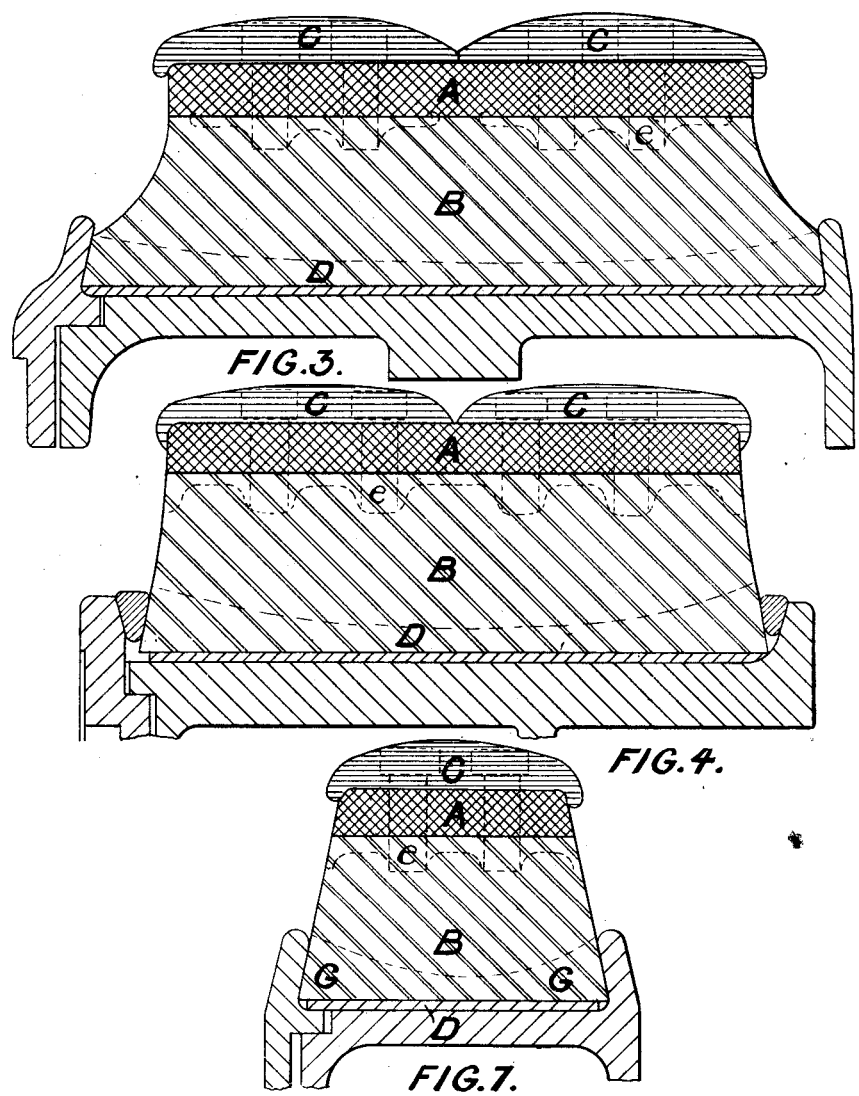

W. T. SMITH.
TIRE.
APPLICATION FILED JUNE 24, 1907.

1,065,978.

Patented July 1, 1913
4 SHEETS—SHEET 3.

WITNESSES.
E. Howard
Joseph Bates.

INVENTOR.
Wm. T. Smith

W. T. SMITH.
TIRE.
APPLICATION FILED JUNE 24, 1907.

1,065,978.

Patented July 1, 1913.
4 SHEETS—SHEET 4.

UNITED STATES PATENT OFFICE.

WILLIAM THOMAS SMITH, OF BOLTON, ENGLAND.

TIRE.

1,065,978.   Specification of Letters Patent.   Patented July 1, 1913.

Application filed June 24, 1907. Serial No. 380,571.

*To all whom it may concern:*

Be it known that I, WILLIAM THOMAS SMITH, British subject, and resident of Bolton, county of Lancaster, England, have invented certain new and useful Improvements in Tires, of which the following is a specification.

This invention relates to improvements in tires applicable more especially for heavy motor vehicles such as busses and wagons.

It refers more particularly to that class of tire in which the elastic portion is expanded against the tread or shoe.

It consists essentially in constructing the tire with an outer ring of canvas, embedded in or cemented together with rubber always maintained in a state of tension placed upon an inner ring of rubber, (with or without layers of canvas) which is compressed within the canvas outer ring which latter is thereby maintained in a state of constant tension as required.

The invention will be fully described with reference to the accompanying drawings forming part of the specification.

Figure 2:
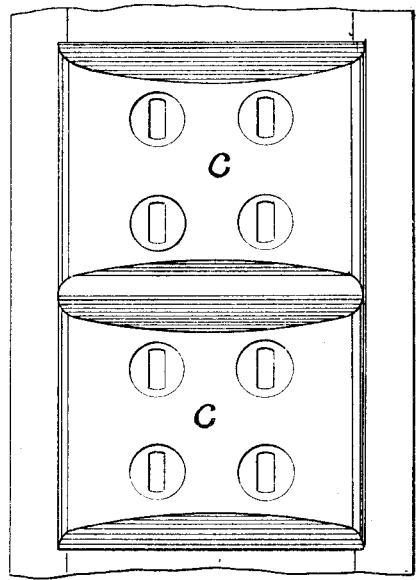
Figure 1:
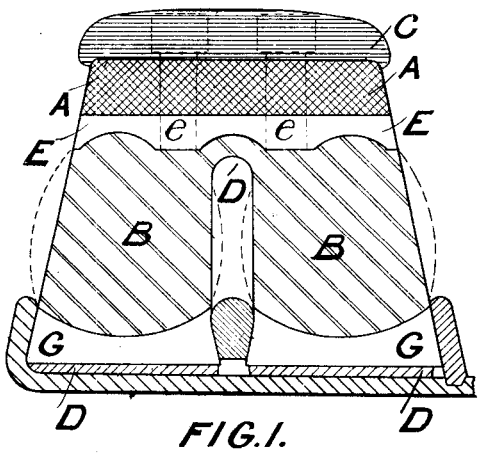
Figure 6:
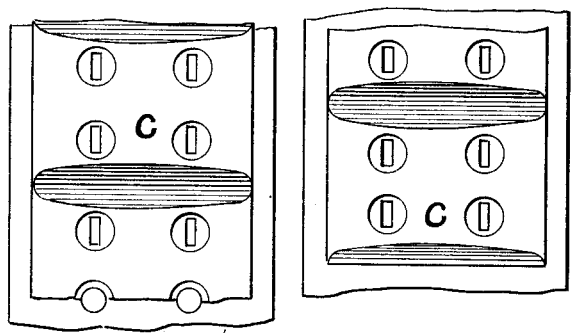
Figure 5:
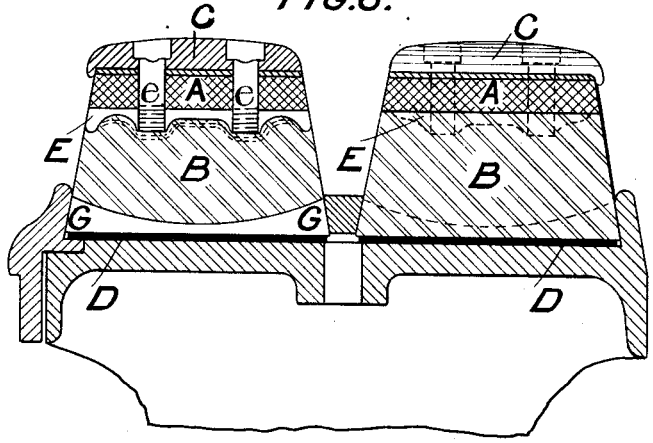
Figure 9:
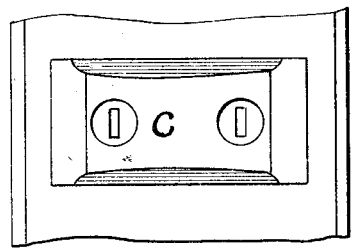
Figure 8:
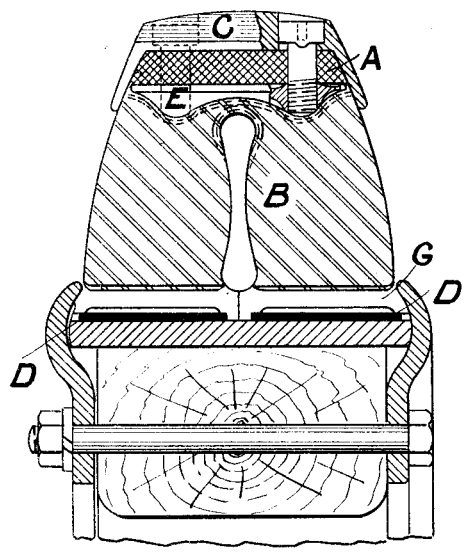

Figure 1. is a transverse section of a single tire. Fig. 2. is a plan of a single tire either as shown in Fig. 1 or Fig. 7. Fig. 3. is a transverse section of tire with double row of metal protector plates. Fig. 4. is a transverse section of tire with double row of metal protector plates showing an arrangement of taper rings for securing the tire. Fig. 5. is a transverse section of double or twin tire. Fig. 6. is a plan of same. Fig. 7. is a transverse section of cushion tire. Fig. 8. is a transverse section of cushion tire showing another arrangement for securing same to the wheel. Fig. 9. is a part plan of same.

The tire comprises a ring B of rubber and a ring A of canvas which is maintained in a state of tension and the rubber in a state of expansion inside it. The ring A of canvas also serves to secure to the tire metal protector plates C and the rubber ring B is held in the desired state of compression by an inner hoop D.

The tire may be built up in several ways to secure the desired result.

The ring of rubber B may be constructed of a suitable diameter and the ring A of canvas may be prepared by rolling the canvas in layers around a collapsible drum leaving the interior of the ring A somewhat larger than the exterior of the rubber ring B. The exterior of the rubber ring is coated with rubber solution and by means of a hoop D is expanded outward into the outer ring A extending the latter to the desired degree.

In another method of construction the outer canvas ring A is made to the desired size upon a collapsible drum, and when so made is maintained in a state of tension by a temporary metal hoop bolted upon its outside by means of the clamping plate E in the interior into which screws are passed from the outside of the temporary hoop. The rubber ring B is then molded and vulcanized within the canvas ring A. When vulcanized the rings A and B are maintained in the desired state by the insertion of a hoop D within the rubber ring B. The temporary hoop is then removed and the clamping plates employed to secure the protector plates C.

In another method of construction the outer canvas ring A may be made as described and the rubber ring B of a greater external diameter than the interior of the ring A the rubber ring B being then compressed into the interior of the canvas ring. If protector plates C are to be employed the clamping plates E are embedded in the rubber ring B.

In another method of construction the rubber ring B may be molded preferably upon a metal hoop D and the layers of canvas to form the ring A be tightly wound around it.

The outer canvas ring A is preferably fitted with protector plates C secured firmly in position by narrow inner screw or clamping plates E such plates being placed at intervals between the canvas ring A, and rubber ring B, secured to the interior of the canvas ring and embedded in the periphery of the soft rubber ring. The interval between the parts allows of the rubber ring B being vulcanized to the canvas ring A.

The outer canvas ring A may at any time be renewed by removing it without destroying or wasting the inner ring of rubber B which is not subject to the same working conditions and consequently to less wear and tear. This may be done by cutting the canvas across and stripping it from the rubber and then applying a fresh ring of canvas by either of the methods above described.

The clamping plates E are formed with screw threaded holes to receive the clamping screws e also.

I prefer to make the clamping plates E with the ends turned downward to form a cup section so as to better retain the rubber of the ring B. Base plates G may be inserted in the rubber ring B to stiffen it and secure it to the rims.

In securing the protector plates to the canvas ring I subject each plate to a pressure considerably over its heaviest working load the lock screws e being screwed down so as to retain the canvas ring A between the plates E and the protector plate. By thus securing the canvas, heating and wear of the fabric and rubber which would otherwise occur is prevented. The protector plates may be secured in any other manner to the periphery of the canvas ring A.

By maintaining the canvas ring always in a state of tension or without any slackness the defects which would otherwise arise if the canvas layer were in a normal state around the rubber are obviated. The canvas ring being already stretched to its limit in building up the tire does not stretch longitudinally as does the ordinary rubber tire surface but is subject to the compressive or radial movement toward the axle which gives the resiliency to a solid or cushion tire. The canvas ring also being in a state of tension over and above that set up in the canvas ring by the tractive force applied for propulsion, the substance of the ring is not creased or slackened upon itself, as would be the case if slack or normal on the tire, by this means disintegration, overheating, or wear of the rubber or ring is reduced to a minimum, the canvas ring being to all intents a flexible hoop shrunk onto the rubber tire base.

The tires shown in Figs. 1 and 8 are constructed of cushion form with a division or space D'; the others are shown solid.

What I claim as my invention and desire to protect by Letters Patent is:—

1. A tire for motor and other road vehicles comprising an outer ring of layers of canvas maintained in a state of constant tension, an inner ring of rubber expanded therein, to which the canvas is vulcanized and caused to adhere, and protector plates affixed to the periphery of the canvas ring substantially as described.

2. A tire for motor and other road vehicles comprising an outer ring of layers of canvas maintained in a state of constant tension, an inner ring of rubber expanded therein, to which the canvas is vulcanized and caused to adhere, a metallic hoop, within the rubber ring by which the rubber is compressed or expanded against the canvas to maintain the tension thereof, and protector plates affixed to the periphery of the canvas ring substantially as described.

In witness whereof, I have hereunto signed my name in the presence of two subscribing witnesses.

WILLIAM THOMAS SMITH.

Witnesses:
J. OWDEN O'BRIEN,
HARRY BARNFATHER